United States Patent [19]

Ernst et al.

[11] 4,181,374

[45] Jan. 1, 1980

[54] ROLLING BEARING HAVING END RINGS MOUNTED TO ENGAGE A HOUSING

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 897,754

[22] Filed: Apr. 17, 1978

[30] Foreign Application Priority Data

Apr. 20, 1977 [DE] Fed. Rep. of Germany ....... 2717425

[51] Int. Cl.² ............................................. F16C 29/06
[52] U.S. Cl. ..................................... 308/6 C; 308/201
[58] Field of Search ................ 308/6 R, 6 C, 201, 236

[56] References Cited

U.S. PATENT DOCUMENTS 4,040,679  8/1977  Teramachi ........................... 308/6 C

FOREIGN PATENT DOCUMENTS 2260022  8/1975  France .................................... 308/6 C
2308013  11/1976  France .................................... 308/201
7414031  5/1976  Netherlands .......................... 308/6 C

*Primary Examiner*—Charles E. Frankfort
*Attorney, Agent, or Firm*—Daniel M. Rosen

[57] ABSTRACT

A linear ball bearing having an outer shell and a cage which define between them a plurality of endless axial raceways filled with balls, has at each end an end ring having a shoulder extending radially outward for axially fixing the bearing in a housing bore. The end ring may be positioned and secured after the bearing shell and balls are situated in the housing. Alternatively, the shoulder may be formed of resilient tongues which are deflectable radially inwardly during insertion of the bearing shell into the housing bore, and which subsequently spring radially outwardly to engage the housing wall and secure the bearing in place.

8 Claims, 4 Drawing Figures

ROLLING BEARING HAVING END RINGS MOUNTED TO ENGAGE A HOUSING

BACKGROUND OF THE INVENTION

This invention relates to a ball bearing formed of an outer sleeve having races extending axially in the bore, a cage having a plurality of ball guides distributed over the periphery and consisting of guideways extending axially and semicircular reversing tracks connecting the guideways in pairs, and endless rows of balls arranged in these ball guides, according to U.S. Pat. No. 4,123,121.

For fixing the ball bearing in the bore of a housing, the known embodiments require additional holding means, for example spring rings, which are arranged in annular grooves of the end rings. The manufacture of end rings having annular grooves by injection molding or casting requires relatively complicated tools with radial slides.

The object of the invention is to improve the ball bearing of the design described, such that with no additional structural expenditure, the ball box can be fixed in the bore of a housing in axial direction as well as secured against rotation, and the parts of the ball bearing will form one structural unit with the housing.

This object is accomplished pursuant to the invention in that the end rings of the ball bearing, attached to the cage and/or the outer sleeve, are provided on the surface with ring-shaped shoulders or formed-on projections whose surfaces, extending radially, will rest against the faces of a housing.

According to another feature of the invention, the projections on the end rings are designed as springy tongues or lips. During insertion of the ball bearing shell into the bore of the housing, these tongues are depressed radially inward into recesses in the surface of the end rings. After insertion, these tongues spring back into their original position. This allows the ball bearing to be completely assembled before insertion into the bore of the housing.

For securing the ball bearing against rotation in the bore of the housing, each of the end rings may be provided with a projection extending radially outward for engaging a slot of the housing.

Additional features of the invention are described in greater detail by means of the embodiments illustrated in the drawings, in which.

Like parts in the different drawings are provided with the same reference numerals in the drawings.

Figure 1:
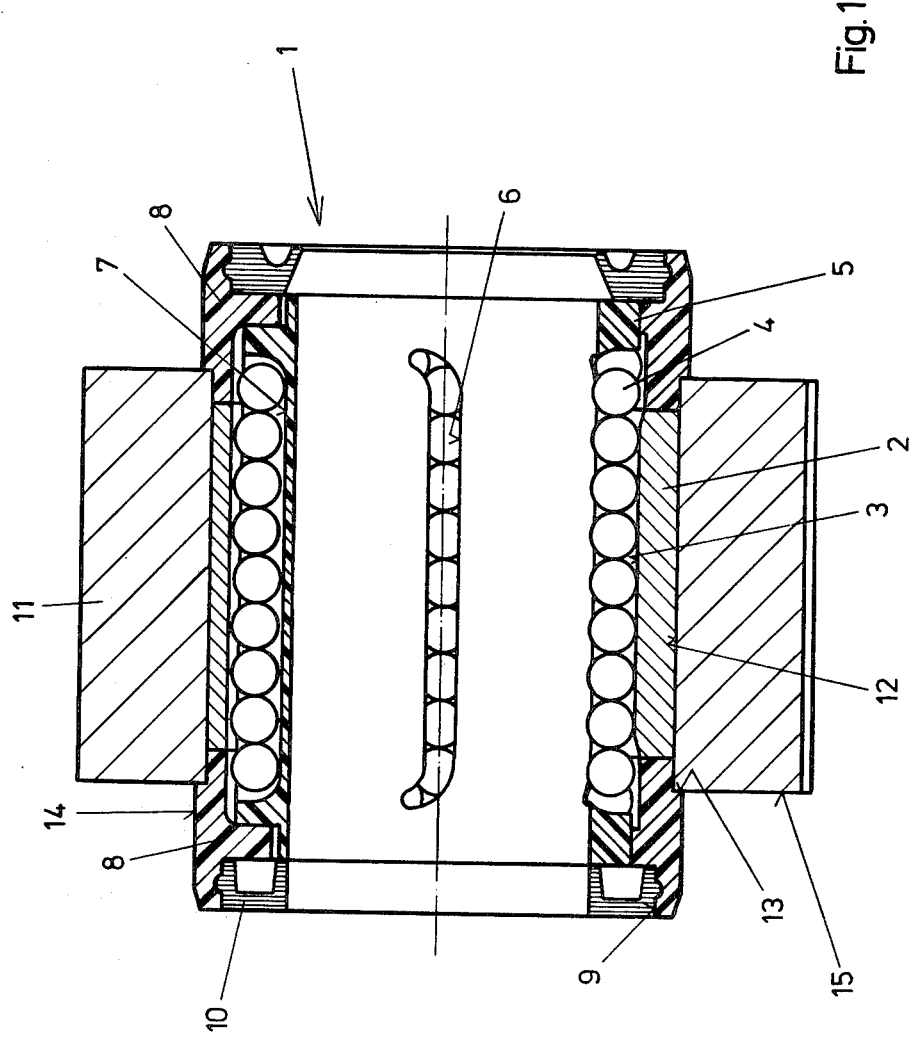
FIG. 1 is a longitudinal sectional view of a ball bearing pursuant to the invention.

The ball bearing 1 represented in FIG. 1 has an outer sleeve 2 with the races 3 for the balls 4, which are arranged in a cage 5. The cage 5 is provided with tracks 6 for guiding the balls 4 into the loaded zone and with return races 7 which in each instance at the end have semicircular reversing tracks for the balls 4 arranged in endless rows. On the portions of the cage 5 which project from the outer sleeve 2, there are end rings provided with recesses 9 for receiving sealing rings 10. In assembly of the structural unit consisting of ball box 1 and housing 11, the cage 5 attached to an end ring 8, and the outer sleeve 2 are first inserted into the bore 12 of the housing. The balls 4 are then fed in, and the second end ring 8 is pushed onto the section of the cage projecting from the outer sleeve 2 until the radially-extending contact surface 13 of the ring-shaped shoulder 14 rests against the face 15 of the housing 11. After attachment of the second end ring 8 to the cage 5, in the manner described in the above-noted prior application, the ball bearing 1 and the housing 11 form one unit. Finally, the sealing rings 10 are snapped into the recesses 9 of the end rings 8.

Figure 2:
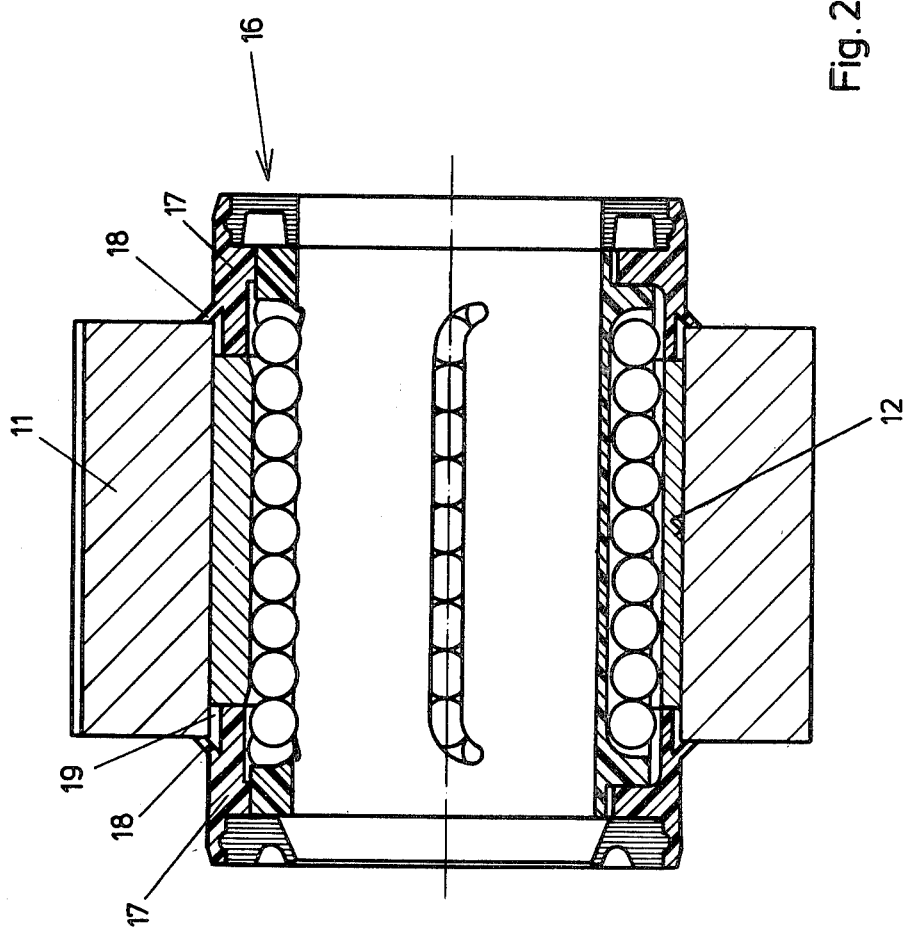
FIG. 2 is a longitudinal sectional view of a modified embodiment of the ball bearing pursuant to the invention.

The ball bearing 16 illustrated in FIG. 2 differs from the FIG. 1 embodiment in that the end rings 17 are provided with springy projections 18 for axial fixation of the ball bearing 16 in the bore of the housing 11. These projections may be pressed radially inward into corresponding recesses 19 on the surface of the end rings 17. The advantage of this embodiment is that the ball bearing 16 may be completely assembled and then inserted into the bore of the housing 11. Here the projections 18 of an end ring 17 are pressed into the recesses 19. After insertion the projections 18 spring back into their original position and fix the ball bearing 16 in axial direction.

Figure 3:
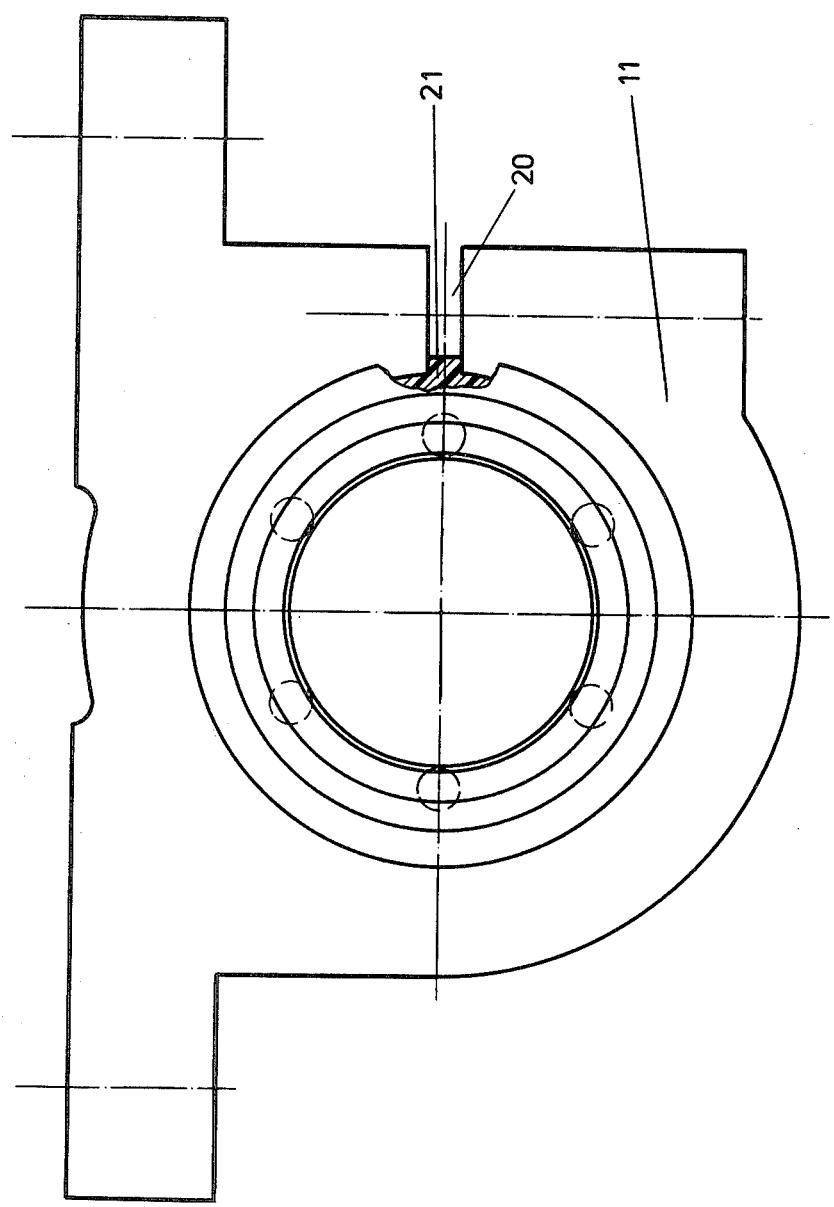
FIG. 3 is a partially cut-away end view of another ball bearing embodiment of the invention situated in a slotted housing.

In FIG. 3 is illustrated a housing 11 with a slot 20 and a ball bearing 1 or 16 of FIG. 1 or 2, respectively. The end rings 8 or 17 in each instance have on their surface a projection 21, extending radially outward, which engages in the slot 20 and secures the ball box 1 or 16 against rotation in the bore 12 of the housing.

Figure 4:
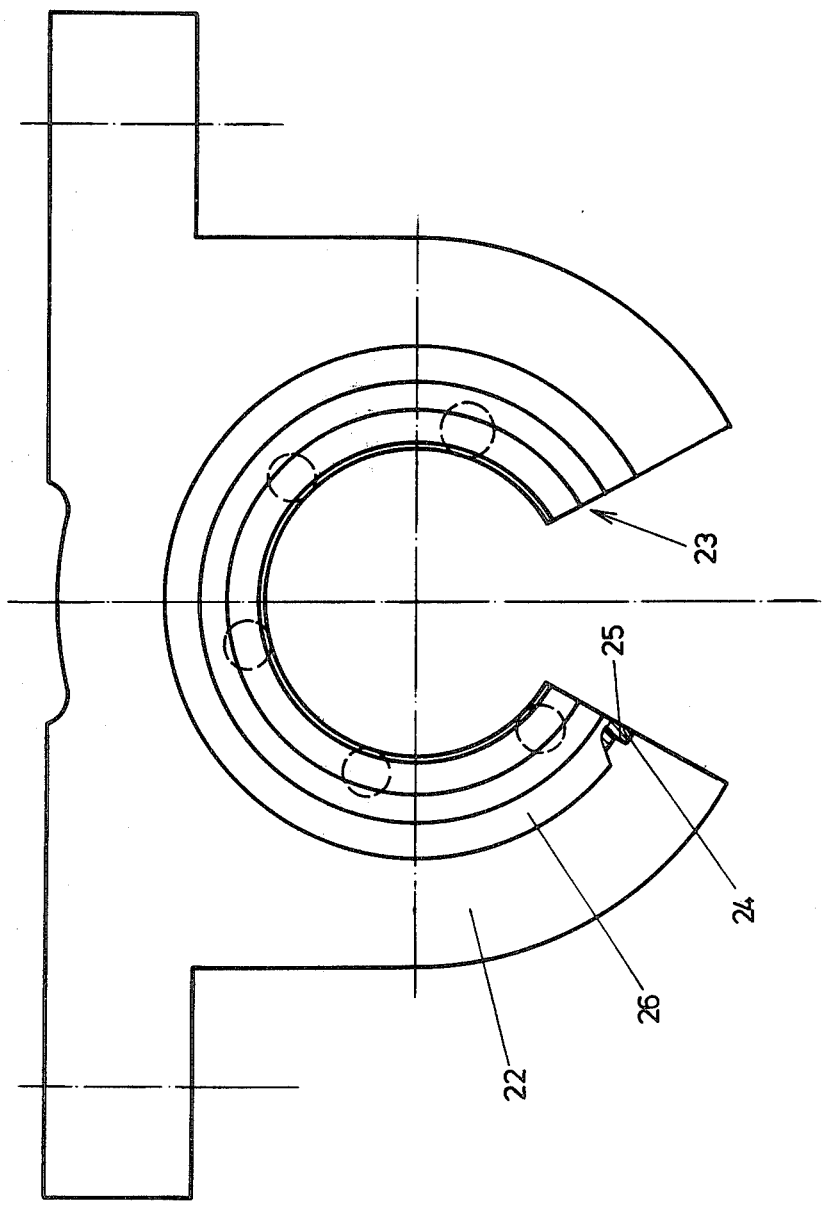
FIG. 4 is an end elevation of a ball bearing situated in an open housing.

FIG. 4 shows an open housing 22 in which is situated an open ball bearing 23; the shell of this bearing has spaced apart radial walls which define the open part of the bearing, and in the vicinity of each of these walls is a projection 24, which extends into a recess 25 of the housing 22 and serves for securing the shell of ball bearing 23 from rotation in the bore of the housing. Securing of this bearing in axial direction is effected by open end rings 26, which in cross-section are designed the same as those of FIG. 1 or 2.

The present invention is not limited to the embodiments illustrated. Many more modifications in design, which will not be enumerated in detail, are possible within the scope and spirit of the invention.

What is claimed is:

1. In a rolling bearing including an outer sleeve adapted to be fit in a bore of a housing, wherein the housing has side faces at the opposite ends of the bore, the bearing having races extending axially of the bore, a cage having a plurality of rolling element guides distributed about its circumference and consisting of guideways extending axially and semicircular reversing tracks connecting said guideways in pairs, and endless rows of rolling elements arranged in said guides, wherein the bore of the outer sleeve has axially extending races and return tracks for the rolling elements, and has a width corresponding to approximately the length of the axially extending guideway sections in the cage, the cage projecting axially beyond the ends of the outer sleeve and beyond the side faces of said housing, said cage having said semicircular reversing tracks in the portion thereof beyond the outer sleeve, and end rings are mounted over the projecting portions of the cage for outwardly covering the reversing tracks; the improvement wherein the peripheral surfaces of the end rings are provided with surfaces that extend radially outwardly of the outer circumferential surface of said outer sleeve and are positioned to rest against said side faces of the housing for fixing the rolling bearing in said housing bore.

2. The rolling bearing of claim 1, wherein the radially extending surfaces of the end rings comprise projections on their outer surfaces and are formed as springy tongues, and recesses for receiving said projections, whereby the projections may be deflected into the recesses on insertion of the bearing into the bore of the housing and, after insertion, spring back in their original projecting positions.

3. The rolling bearing of claim 1 wherein the radially extending surfaces of the end rings comprise annular shoulders on the end rings.

4. The rolling bearing of any one of claims 1, 2 or 3 wherein the housing is axially slit and the end rings are provided on their surfaces with projections which extend radially outward into said slit of the housing.

5. The rolling bearing of any one of claims 1, 2 or 3 wherein the bearing and housing have axially extending openings, and the end rings of the bearing have projections positioned to extend into recesses on the surfaces of the open section of the housing.

6. The rolling bearing of claim 1 wherein said elements are balls.

7. The rolling bearing of claim 1 wherein the end rings are connected to the cage.

8. The rolling bearing of claim 1 wherein the end rings are connected to the outer sleeve.

* * * * *